United States Patent
Kipnis

(10) Patent No.: US 10,065,595 B1
(45) Date of Patent: Sep. 4, 2018

(54) AIRBAG SYSTEM

(71) Applicant: Michael Kipnis, Wheeling, IL (US)

(72) Inventor: Michael Kipnis, Wheeling, IL (US)

(73) Assignee: Cyclazoom LLC, Evanston, IL (US)

( * ) Notice: Subject to any disclaimer, the term of this patent is extended or adjusted under 35 U.S.C. 154(b) by 0 days.

(21) Appl. No.: 15/612,566

(22) Filed: Jun. 2, 2017

Related U.S. Application Data

(60) Provisional application No. 62/344,815, filed on Jun. 2, 2016.

(51) Int. Cl.

| | |
|---|---|
| *B60R 21/233* | (2006.01) |
| *B60R 21/203* | (2006.01) |
| *B60R 21/2334* | (2011.01) |
| *B60R 21/2338* | (2011.01) |
| *B60R 21/01* | (2006.01) |
| *B60R 21/00* | (2006.01) |
| *B60R 21/231* | (2011.01) |

(52) U.S. Cl.
CPC .......... *B60R 21/2334* (2013.01); *B60R 21/01* (2013.01); *B60R 21/203* (2013.01); *B60R 21/233* (2013.01); *B60R 21/2338* (2013.01); *B60R 2021/0032* (2013.01); *B60R 2021/23107* (2013.01); *B60R 2021/23308* (2013.01); *B60R 2021/23386* (2013.01)

(58) Field of Classification Search
CPC . B60R 21/203; B60R 21/233; B60R 21/2334; B60R 2021/23107; B60R 2021/23308; B60R 2021/23386
See application file for complete search history.

(56) References Cited

U.S. PATENT DOCUMENTS

| | | | | |
|---|---|---|---|---|
| 3,840,246 | A | * 10/1974 | McCullough, Jr. | ..... B60R 21/23 102/531 |
| 4,136,894 | A | * 1/1979 | Ono | ........ B60R 21/26 102/443 |
| 4,215,878 | A | * 8/1980 | Hirbod | ..... B60R 19/32 180/274 |
| 4,449,728 | A | 5/1984 | Pilatzki | |
| 4,877,264 | A | 10/1989 | Cuevas | |
| 5,158,323 | A | 10/1992 | Yamamoto et al. | |
| 5,529,337 | A | 6/1996 | Takeda et al. | |
| 5,779,261 | A | 7/1998 | Honda | |
| 5,865,466 | A | 2/1999 | Yamamoto et al. | |
| 5,967,549 | A | 10/1999 | Allen et al. | |

(Continued)

*Primary Examiner* — Barry J Gooden, Jr.
(74) *Attorney, Agent, or Firm* — Brian Roffe

(57) ABSTRACT

Vehicular airbag system for a driver includes a steering column, a steering wheel assembly rotatably mounted to the steering column and including a core, and a plurality of airbags arranged in the core and configured to inflate outward from the core. The airbags are nested such that each airbag is configured to inflate within or over at least one other airbag. Activatable inflator systems are configured to inflate a respective airbag at a different speed of inflation. A control system is coupled to the inflator systems and controls activation of the inflator systems and thus inflation of the airbags. The inflator systems are configured such that one of the inflator systems configured to inflate an innermost airbag has a highest speed of inflation of the inflator systems and one of the inflator systems configured to inflate an outermost airbag has a lowest speed of inflation of the inflator system.

24 Claims, 8 Drawing Sheets

(56) References Cited

U.S. PATENT DOCUMENTS

| | | | |
|---|---|---|---|
| 6,139,052 | A | 10/2000 | Preamprasitchai |
| 6,308,983 | B1 | 10/2001 | Sinnhuber |
| 6,419,262 | B1 | 7/2002 | Fendt et al. |
| 6,439,605 | B2 | 8/2002 | Anyoshi |
| 6,702,320 | B1 * | 3/2004 | Lang .................. B60R 21/2646 280/729 |
| 6,866,291 | B2 | 3/2005 | Abe et al. |
| 7,111,866 | B2 | 9/2006 | Abe et al. |
| 7,125,073 | B2 * | 10/2006 | Yoshida ............... B60N 2/2812 297/216.11 |
| 8,985,622 | B1 * | 3/2015 | Cannon ............... B60N 2/4882 280/730.2 |
| 9,227,587 | B1 * | 1/2016 | Belwafa ............... B60R 21/205 |
| 9,550,469 | B2 | 1/2017 | Sato et al. |
| 9,566,929 | B1 | 2/2017 | Belwafa et al. |
| 9,731,677 | B1 | 8/2017 | Belwafa et al. |
| 9,758,121 | B2 * | 9/2017 | Paxton .................. B60R 21/205 |
| 9,802,568 | B1 | 10/2017 | Lamer |
| 2004/0169406 | A1 * | 9/2004 | Yoshida ............... B60N 2/2812 297/216.11 |
| 2007/0126217 | A1 * | 6/2007 | Nayef .................. B60R 21/205 280/732 |
| 2015/0166002 | A1 * | 6/2015 | Fukawatase .......... B60R 21/233 280/730.1 |
| 2016/0046254 | A1 * | 2/2016 | Yamada ............... B60R 21/233 280/729 |
| 2017/0072891 | A1 * | 3/2017 | Paxton .................. B60R 21/205 |
| 2017/0369019 | A1 * | 12/2017 | Jeong .................... B60R 21/16 |

\* cited by examiner

AIRBAG SYSTEM

CROSS-REFERENCE TO RELATED APPLICATION

This application claims priority of U.S. provisional patent application Ser. No. 62/344,815 filed Jun. 2, 2016, which is incorporated by reference herein.

FIELD OF THE INVENTION

This invention is generally related to airbag deployment systems for vehicles and more specification to an arrangement of airbags configured to enable varied and optimized deployment in the event of an accident involving the vehicle for which airbag deployment is warranted and which is tailored to the occupant or other object to be protected by the deploying airbags.

SUMMARY OF THE INVENTION

One embodiment of a vehicular airbag system for a driver in accordance with the invention includes a steering column, a steering wheel assembly rotatably mounted to the steering column and including a core, and a plurality of airbags arranged in the core and configured to inflate outward from the core. The airbags are nested such that each airbag is configured to inflate within or over at least one other airbag. A plurality of activatable inflator systems is configured to inflate a respective airbag at a different speed of inflation. A control system is coupled to the inflator systems and controls activation of the inflator systems and thus inflation of the airbags. The inflator systems are configured such that one of the inflator systems configured to inflate an innermost one of the airbags has a highest speed of inflation of the inflator systems and one of the inflator systems configured to inflate an outermost one of the airbags has a lowest speed of inflation of the inflator system.

Retainers are provided in the housing of the core and each retains a respective inflator system. The retainers include a lower wall and a preferably tubular side wall extending upward from an outer edge of the lower wall. Each airbag is attached to the side wall of a respective retainer. More specifically, the system includes a first retainer that retains a first one of the inflator systems that inflates an outermost inflating one of the airbags, and second retainer that retains a second one of the inflator systems that inflates another one of the airbags and is connected to the first one of the inflator systems.

If three airbags are provided, e.g., an outermost airbag, an intermediate airbag and an innermost airbag, the system includes a first retainer that retains a first one of the inflator systems that inflates the outermost airbag, and a second retainer that retains a second one of the inflator systems that inflates the intermediate airbag and is connected to the first one of the inflator systems. The second retainer is inward of and spaced apart from the first retainer to define an annular space between the first and second retainers through which inflation medium from the first one of the inflator systems flows to inflate the outermost airbag. A third retainer retains a third one of the inflator systems that inflates the innermost airbag and is connected to the second one of the inflator systems. The third retainer is inward of and spaced apart from the second retainer to define an annular space between the second and third retainers through which inflation medium from the second one of the inflator systems flows to inflate the intermediate airbag.

Another embodiment of a vehicular airbag system for a driver in accordance with the invention includes a steering column, a steering wheel assembly rotatably mounted to the steering column and including a core, at least one airbag arranged in the core and configured to inflate outward from the core, at least one inflator system configured to inflate a respective airbag, and a control system coupled to the at least one inflator system to control activation of the at least one inflator system and thus inflation of the at least one airbag. A plurality of elongate belts are arranged in the core around the at least one airbag and having a predetermined length or expansion limit to limit inflation of the at least one airbag.

The belts may include first and second sets of belts, wherein the belts in the first set are configured to extend across the at least one airbag from a first side to an opposite second side at an angle to the belts in the second set which are configured to extend across the at least one airbag from a third side different than the first and second sides to an opposite fourth side.

A holder is arranged in the core for retaining the at least one airbag, both ends of the belts being attached to the holder. If multiple airbags are provided, they may be nested such that each of the airbags is configured to inflate within or over at least one other of the airbags. The belts extend over and around the outermost airbag. In this case, the at least one inflator system comprises a plurality of inflator systems, each configured to inflate a respective airbag at a different speed of inflation. Also, the inflator system is configured such that one of the inflator systems is configured to inflate an innermost airbag has a highest speed of inflation of the inflator systems and one of the inflator systems is configured to inflate an outermost airbag has a lowest speed of inflation of the inflator system. Intermediate airbags are inflated at a speed less than the immediate innerlying airbag and greater than the immediate overlying airbag.

Yet another embodiment of a vehicular airbag system for a driver in accordance with the invention includes a steering column, a steering wheel assembly rotatably mounted to the steering column and including a core and a holder in the core, and a plurality of airbag support brackets arranged on the holder each retaining an airbag assembly having an inflator system and an airbag configured to inflate outward from the core when inflated by the inflator system. The support brackets have different heights relative to a uniformly planar upper surface of the holder such that the airbags inflate at different levels relative to the holder.

In one embodiment, a first set of the airbag assemblies includes a large airbag and a second set of the airbag assemblies includes a small airbag. The airbags may be generally triangular. Connectors are optionally provided for connecting sides of the airbags of the first set of airbag assemblies together. The support brackets for the first set of airbag assemblies are arranged in a circle to provide a circular airbag formed from the airbags of the first set of airbag assemblies.

In a specific embodiment, the first set of airbag assemblies includes six airbag assemblies distributed equiangularly around the upper surface of the holder. The airbags of the second set of the airbag assemblies are configured to be inflated at a level closer to the upper surface of the holder than the airbags in the first set of airbag assemblies. As such, the support brackets for the second set of airbag assemblies are shorter in height relative to the upper surface of the holder than the support brackets for the first set of airbag assemblies.

If the second set of airbag assemblies includes six airbag assemblies distributed equiangularly around the upper surface of the holder, then the first set of airbag assemblies can include six airbag assemblies distributed equiangularly around the upper surface of the holder and outward of the six airbag assemblies of the second set.

In all embodiments, one of the support brackets is arranged in a center of the upper surface of the holder and has a height taller relative to the upper surface of the holder taller than the support brackets for the first and second sets of airbag assemblies. An airbag of the airbag assembly retained on the one of the support brackets is configured to inflate above all other airbags of the airbag assemblies.

Further objects and advantages of this invention will become apparent from a consideration of the included figures with corresponding description.

DESCRIPTION OF THE DRAWINGS

The invention, together with further advantages thereof, may best be understood by reference to the following description taken in conjunction with the accompanying drawings, wherein like reference numerals identify like elements, and wherein.

DETAILED DESCRIPTION OF THE INVENTION

Figure 1:
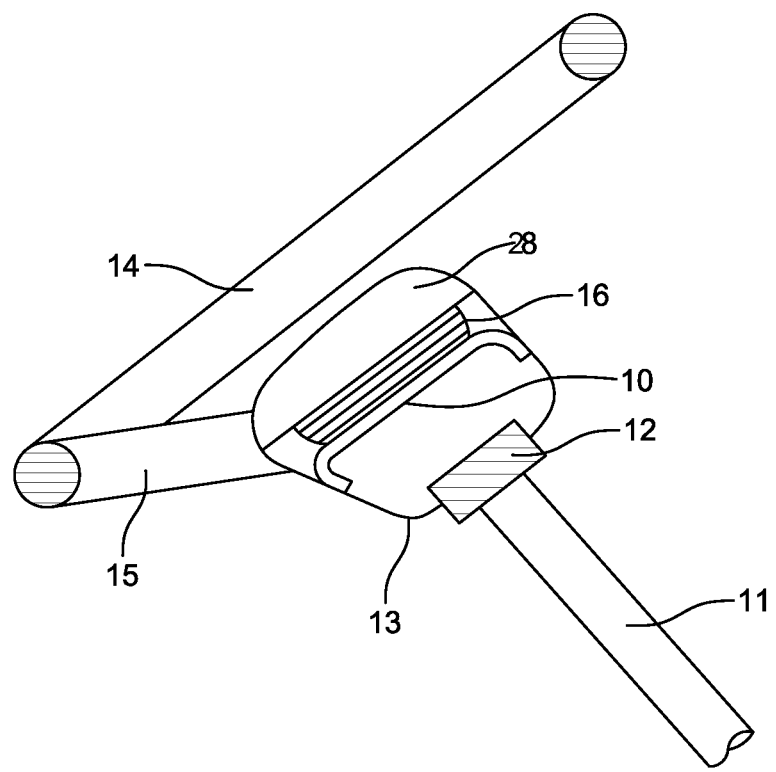
FIG. 1 is a cross-sectional view of a conventional airbag assembly incorporated into a steering wheel.

Referring to the accompanying drawings wherein like reference numbers refer to the same or similar elements, FIG. 1 shows conventional positioning of an airbag assembly incorporated into a steering wheel assembly that is typically provided in various vehicles. The steering wheel assembly comprises a steering column 11 mounted to a frame of the vehicle in a known manner, e.g., to enable it to rotate relative to the frame of the vehicle and cause a change in the direction in which one or more steered wheels on the vehicle are oriented. The steering wheel assembly also comprises a steering wheel 14 having, for example, an annular frame and one or more sprockets 15 connecting the annular frame to a core or hub 13, which is also part of the steering wheel assembly. A connector 12 connects the steering column 11 to the core 13.

The foregoing description of a steering wheel assembly is commonly conventionally found in vehicles and serves as the basis for an explanation of the invention. It should be understood that the invention is not limited to the steering wheel assembly shown in FIG. 1 and the invention may be incorporated into variants of the steering wheel assembly shown in FIG. 1. The invention may thus be considered as that part of the arrangement aside from the steering column, in which case, the invention is attached to a steering column for use. It may also be considered to encompass the steering column.

The invention entails housing an airbag assembly 28 in the core 13, an airbag inflator system 16 behind the airbag assembly 28, and a holder 10 that retains the airbag inflator system 16 in the core 13. Airbag inflator system 16 includes, as known to those skilled in the airbag field, inflation medium, e.g., pressurized gas, or means for generating inflation medium which inflation medium is provided to the airbag assembly 28 to inflate the airbags in the airbag assembly 28, discussed below.

Figure 2:
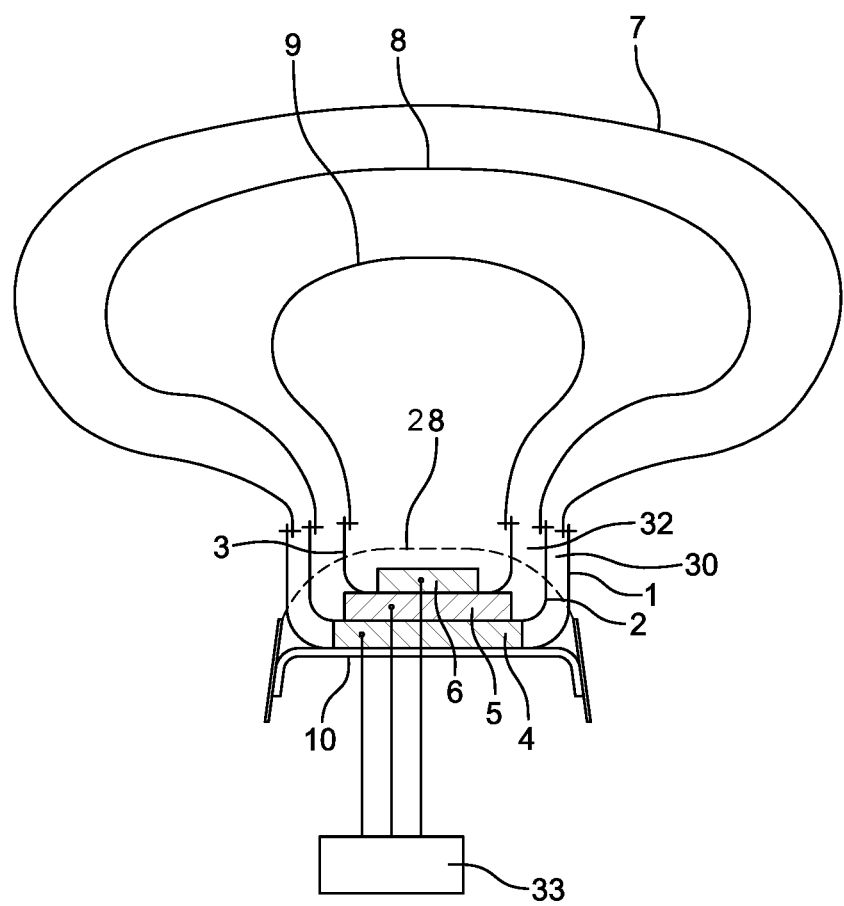
FIG. 2 is a cross-section of a first embodiment of a deployed airbag in accordance with the invention.

FIG. 2 shows one particular configuration of the airbag assembly 28 which comprises a plurality of airbags and means for independently or individually inflating each airbag. More specifically, the illustrated embodiment of the airbag assembly 28 includes an outermost airbag 7, an intermediate airbag 8 and an innermost airbag 9. Airbags 7, 8, 9 are nested so that airbag 8 is in the interior of airbag 7 and airbag 9 is in the interior of airbag 8.

Retainers 1, 2, 3 are provided to retain the airbags 7, 8, 9, respectively. Each retainer 1, 2, 3 has a general cup-shape and is open at an upper end. Each retainer 1, 2, 3, is therefore defined basically by a generally circular lower wall and a side wall extending upward from an outer edge of the lower wall. The side wall is shown as being generally tubular but other shapes for the side wall are possible and encompassed within the scope and spirit of the invention.

Retainer 1 is the retainer closest to the steering column 11, and has an inflator system 4 on its upper surface. Retainer 1 is preferably attached to the holder 10. Inflator system 4 is part of the airbag inflator system 16 and is configured to inflate the outermost airbag 7 which is attached to the retainer 1, e.g., via the side wall. Attachment of the airbag 7 to the retainer 1 may be by any means known to those skilled in the art to which this invention pertains.

Retainer 2 is mounted onto the inflator system 4 such that an annular space 30 is formed between the side walls of retainers 1 and 2. The annular space 30 is necessary to allow for flow of inflation medium generated by inflator system 4 into a space between airbags 7 and 8 to thereby cause inflation of airbag 7. Inflator system 5 is part of the airbag inflator system 16 and is configured to inflate the intermediate airbag 8 which is attached to the retainer 2, e.g., via the side wall. Attachment of the airbag 8 to the retainer 2 may be by any means known to those skilled in the art to which this invention pertains.

Retainer 3 is mounted onto the inflator system 5 such that an annular space 32 is formed between the side walls of retainers 2 and 3. The annular space 32 is necessary to allow for flow of inflation medium generated by inflator system 5 into a space between airbags 8 and 9 to thereby cause inflation of airbag 8. Inflator system 6 is part of the airbag inflator system 16 and is configured to inflate the innermost airbag 9 which is attached to the retainer 3, e.g., via the side wall. Attachment of the airbag 9 to the retainer 3 may be by any means known to those skilled in the art to which this invention pertains.

FIG. 2 also shows that the inflator systems 4, 5, 6 are housed within a cover of the airbag assembly 28, shown in dotted lines in FIG. 2. Airbags 7, 8, 9 are folded in a manner known to those skilled in the art into the housing of the airbag assembly 28 that is arranged in the core 13. A housing on the steering wheel therefore includes the retainers 1, 2, 3, inflator system 16 having inflator systems 4, 5, 6, folded airbags 7, 8, 9, and a holder 10 to which the retainer 1 is attached.

A control system 33 is also provided to manage activation of the inflator systems 4, 5, 6 to effect a desired manner of inflation described below. Control system 33 is coupled to each inflator system 4, 5, 6, e.g., by a wire, and can activate the inflator systems 4, 5,6 by directly an inflation signal to the inflator systems 4, 5, 6, The inflation system can cause ignition of an igniter material/propellant or release of inflation medium from a source thereof.

FIG. 2 illustrates a concept of providing multiple inflator systems 4, 5, 6, each activatable in a conventional manner to inflate a respective one of a plurality of nested airbags. By nested airbags as used herein, it means that each airbag, aside from an outermost airbag, is configured to inflate within one or more overlying airbags. Thus, in the illustrated embodiment, airbag 8 inflates within airbag 7, and airbag 9 inflates within airbag 8 which in turn inflates within airbag 7. Airbags 7 and 8 thus overlie airbag 9.

In a particularly beneficial embodiment, the invention configures activatable inflator systems 4, 5, 6 with different inflation parameters to provide a varying speed of inflation. Inflator system 6 is configured to be activated in order to inflate airbag 9 at the highest speed of inflation, e.g., provide for the higher rate of inflow of inflation medium into the airbag 9. Inflator system 5 is configured to be activated to inflate airbag 8 at a lower speed of inflation than the inflation speed at which inflator system 6 inflates airbag 9, e.g., provide for a lower rate of inflow of inflation medium into the airbag 8. Inflator system 4 is configured to be activated to inflate airbag 7 at a lower speed of inflation than the inflation speed at which inflator system 5 inflates airbag 8, e.g., provide for a lower rate of inflow of inflation medium into the airbag 7. This decrease in inflation speed relative to the nested position of the airbags 7, 8, 9, is extremely advantageous because the impact of the outermost airbag 7 against the occupant sought to be protected by the inflating airbag is muted from what the force would be if a single airbag is inflated. A single inflator airbag system results in a significant impact against the occupant potentially injuring the occupant.

Inflation speed may therefore be considered the rate at which the inflation medium is directed into the airbag. It is dependent on the manner in which the inflation medium is generated or provided, and may be dependent on, for example, the burning rate of propellant, and/or the opening of a valve that controls inflow of pressurized gas. Any number of known techniques to control inflation speed may be applied in the invention and all are considered to be within the scope and spirit of the invention.

By contrast, in accordance with the invention, the variably inflated, multiple airbags results in the innermost airbag being inflated first, then the sequentially overlying airbags in a relative gentle, but potentially rapid progression. Depending on the parameters of the crash, the occupant may impact the outermost airbag 7 at a time when only the innermost airbag 9 has fully inflated, and airbags 7 and 8 are only partly inflated. This however will still protect the occupant and prevent them from impacting the steering wheel 14. Similarly, the occupant may impact the outermost airbag 7 at a time when only the innermost airbag 9 and the intermediate airbag 8 have fully inflated, and airbag 7 is only partly inflated. This however will also protect the occupant and prevent them from impacting the steering wheel 14. Finally, the occupant may impact the outermost airbag 7 at a time when all of the airbags 7, 8, 9 have fully inflated, which will obviously provide protection.

Thus, by staggering the time at which the airbags 7, 8, 9 are fully inflated, a better cushioning effect is provided by the invention.

It is possible to provide any number of airbags, each with its own dedicated inflator system. The use of three airbags is only the illustrated embodiment, and any number of nested airbags may be provided in accordance with the invention, whether two, four, or more than four.

There may be one or more innermost ones of the airbags. i.e., two airbags are at the center of the core or at the same smallest distance from a center of the core. In this case, one or both of the innermost ones of the airbags is inflated at the highest speed of inflation. Similarly, there may be one or more outermost ones of the airbags. i.e., two or more airbags are at the same largest distance from a center of the core. In this case, one, some or all of the outermost ones of the airbags is inflated at the lowest speed of inflation.

Control system 33 is provided with parameters of the crash and directs activation of the inflator systems 4, 5, 6 accordingly. A time-based inflation can be provided by the control system 33. Control system 33 could also potentially direct inflation of only one of the airbags 7, 8, 9 via its respective inflator system 4, 5, 6, even though multiple airbags and respective inflator systems are present.

Figure 3:
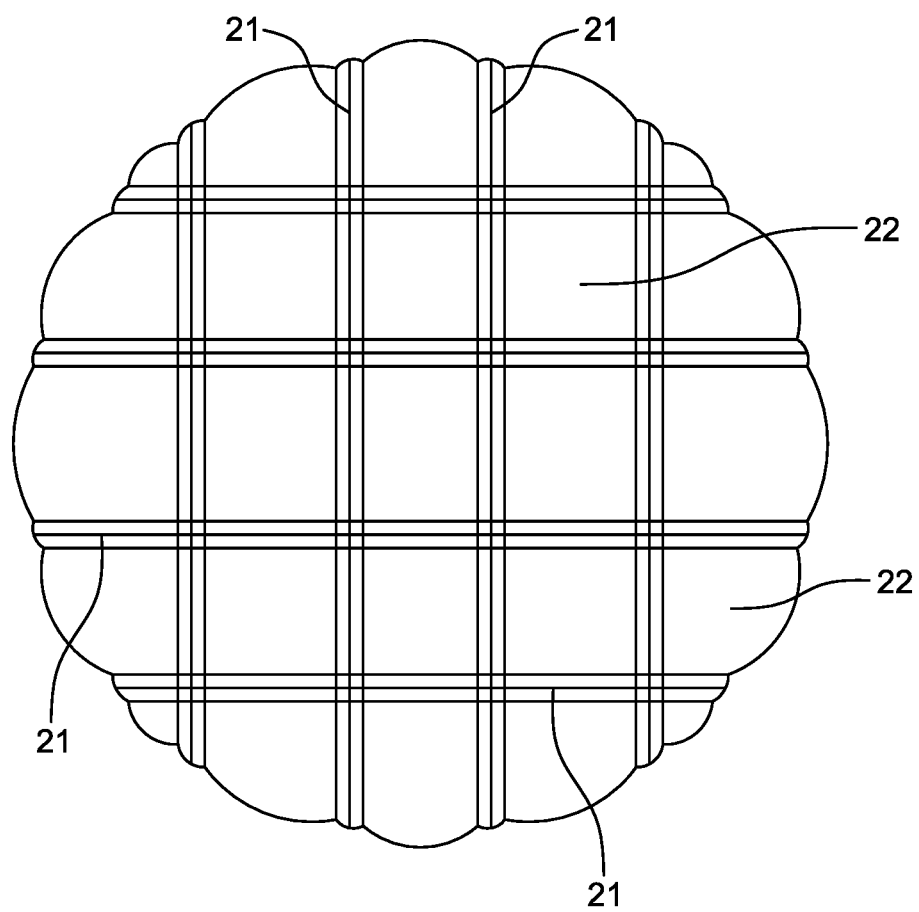
FIG. 3 is a front view of the first embodiment of the deployed airbag shown in FIG. 2.
Figure 4:
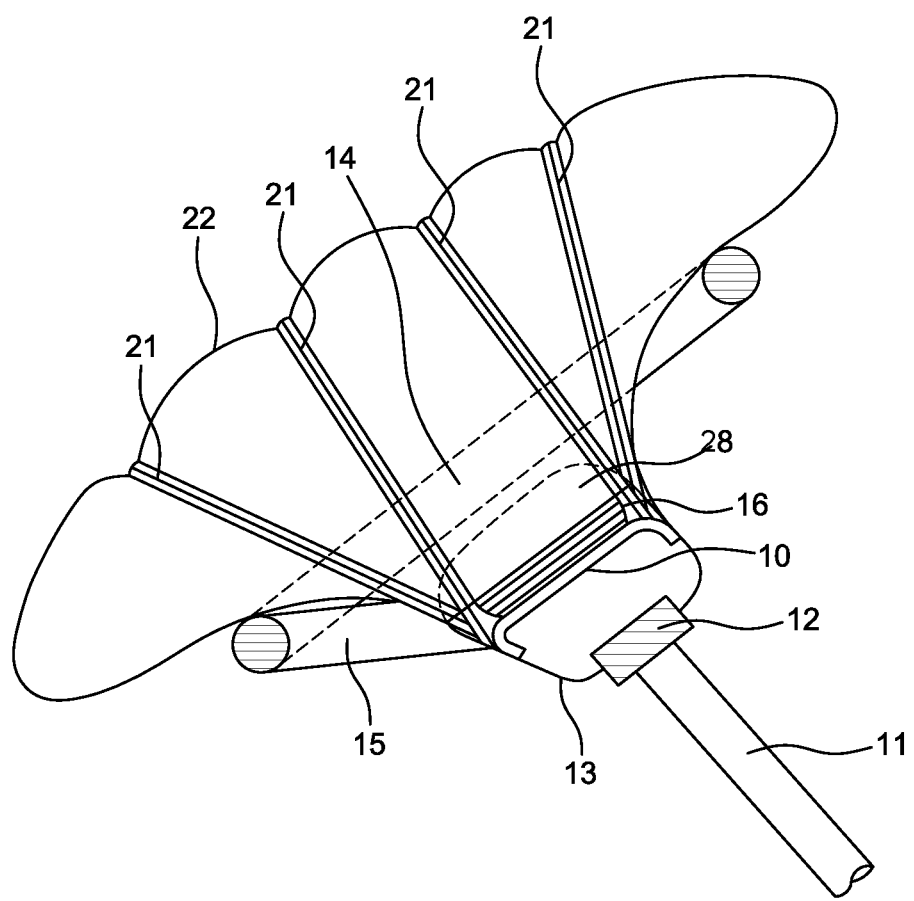
FIG. 4 is a side view of the deployed airbag shown in FIG. 3.

FIGS. 3 and 4 show the possibility of using belts 21 to limit the inflation of an airbag 22. If implemented with the airbag assembly shown in FIG. 2, the belts 21 would limit inflation of the outermost airbag 7. The belts 21 are each elongate and each end is securely attached to the core 13 or holder 10. The belts 21 may be made flexible and are housed in the housing on the core 13 before deployment of the airbags from the core 13. The belts 21 could also be inflexible and provided with their full length and folded into the core 13.

Upon inflation of the airbag or airbags from the core 13, the belts 21 expand but their expansion is limited to a predetermined distance from the steering wheel 14. This distance is determined based on, for example, the distance between the steering wheel 14 and the front surface of the driver's seat and typical characteristics of the occupant. Limiting expansion of the belts 21 is obtained by appropriate manufacture, e.g., provide a certain, limited degree of expansion.

The number and placement of the belts 21 can also vary depending on, for example, the size of the airbag 22. As shown in FIG. 4, there are a total of eight belts 21, four belts 21 are parallel to one another (extending from one side of the airbag to an opposite side-left to right in FIG. 3) and another four belts are parallel to one another and perpendicular to the other set of four belts 21 (extending from one side of the airbag to an opposite side-top to bottom in FIG. 3). Different angular configurations of sets of parallel belts 21 can also be used in the invention, other than perpendicular configuration.

Although the embodiment of FIGS. 3 and 4 is illustrated with respect to a driver's airbag inflating from the steering wheel assembly, the same use of belts may be applied to different airbag arrangements that do not necessarily deploy from a steering wheel assembly.

Figure 5:
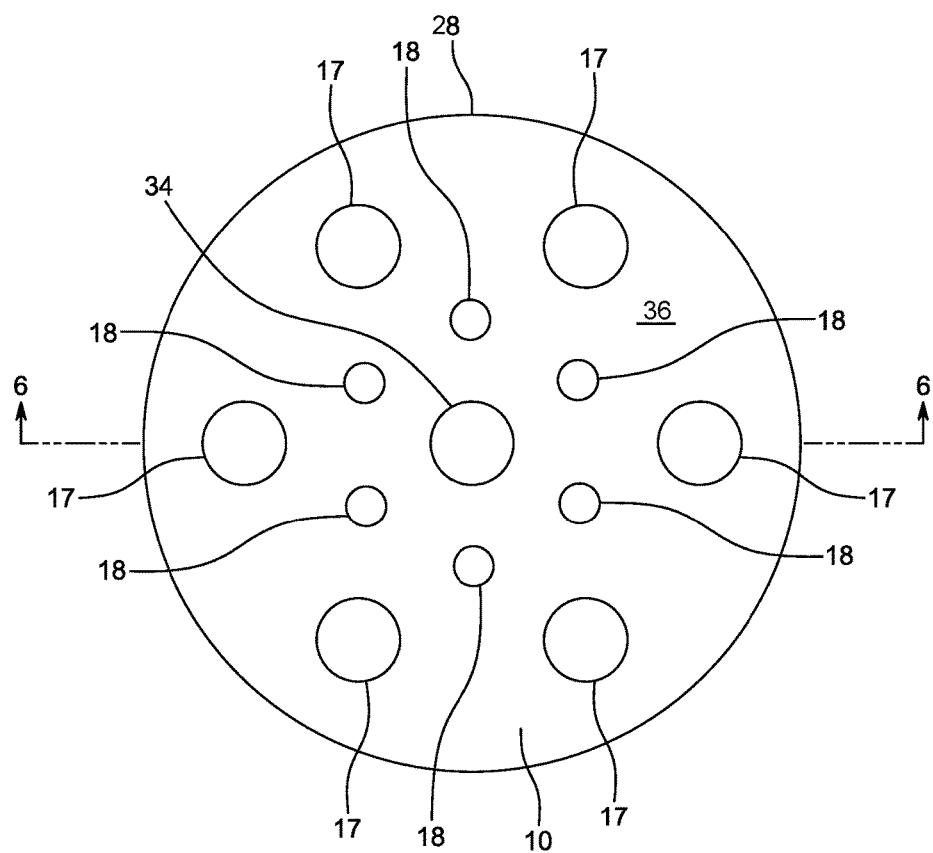
FIG. 5 is a view of an airbag assembly in accordance with the invention mounted on a steering wheel with the cover removed to show the positioning of the airbags.
Figure 6:
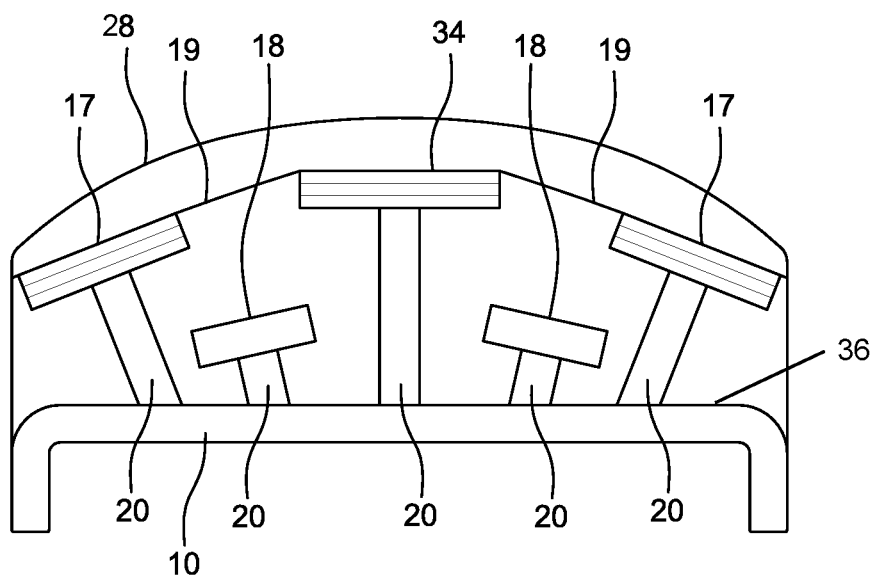
FIG. 6 is a cross-sectional view of the airbag assembly shown in FIG. 5 taken along the line 6-6 in FIG. 5.

Referring now to FIGS. 5-8, an embodiment of an airbag system is illustrated wherein different sized and shaped airbags are inflated. FIG. 5 shows a plurality of airbag assemblies 17, 18 arranged on the holder 10 of the airbag system 28. Airbags 17A in airbag assemblies 17 are larger airbags that are configured to inflate into a generally triangular shape (see FIG. 7) while airbags 18A in airbag assemblies 18 are smaller airbags that are also configured to inflate into a generally triangular shape (see FIG. 7). A central airbag assembly 34 includes an airbag 34A that is configured to inflate into a circular shape (see FIG. 7). Each airbag assembly 17, 18, 34 also includes an inflator system controlled by a control system, not shown in this embodiment. The control system may be configured to inflate one (e.g., only airbag 34A via its inflator system), all of airbags 17A, 18A and 34A or any number therebetween.

Support brackets 20 are provided to support the airbag assemblies 17, 18, 34 vertically above the uniformly planar upper surface 36 of the holder 10. Also, each airbag assembly 17, 18, 34 includes an inflator to inflate the airbag thereof. By uniformly planar, it is meant that the upper surface 36 is flat. As an alternative to providing a flat upper surface, it is possible to provide the support brackets 20 at different heights relative to a common actual or virtual plane. The important aspect of this embodiment may be considered that, relative to a common plane a set distance from the center of impact of the airbags with the occupant, the airbags have their maximum inflation state at different distances from the common plane. Using the holder 10 with its uniformly planar upper surface 36 and different sized support brackets 20 attached to or integrated into this surface 36 or holder 10 is only one way to achieve this objective and other, equivalents ways are encompassed within the scope and spirit of the invention.

FIG. 5 shows a pattern in which the airbag assemblies 17, 18, 34 are arranged. In the center, there is the airbag assembly 34 which is configured to inflate as the uppermost airbag 34A (see FIG. 7). Outward from the support bracket 20 on which the central airbag assembly 34 is mounted, there are six support brackets 20 on which six airbag assemblies 18 are mounted. Outward from the six support brackets 20 on which the six airbag assemblies 18, there are six support brackets 20 in which six airbag assemblies 17 are mounted. The supports for airbag assemblies 17, 18 may be equiangularly distributed around the holder 10, i.e., angularly spaced apart from one another by the same angle, e.g. about 60 degrees by virtue of the presence of six support brackets 20.

There may be a different number of airbag assemblies 17, 18 and a corresponding number of support brackets 20.

Figure 7:
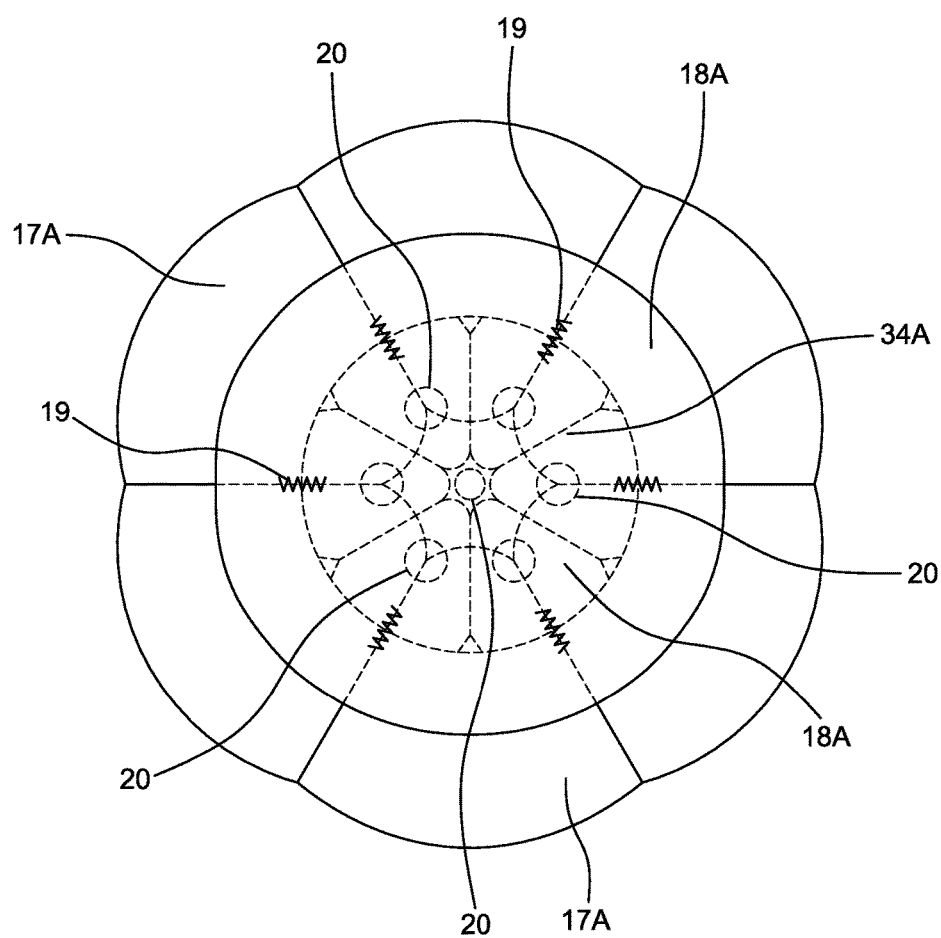
FIG. 7 is a front view of the deployed airbags from the airbag system shown in FIG. 5.

Connectors 19 attach airbags 17A of the airbag assemblies 17 together along lateral sides (see FIG. 7). This attachment provided by connectors 19, which may be ties, serves to provide the airbags 17A of airbag assemblies 17 with a joined inflated structure having the general form of a circle as shown in FIG. 7. The airbag 34A of the airbag assembly 34 inflates above this circular form provided by airbags 17A of airbag assemblies 17 as shown in FIG. 7. The airbags 18A of the airbag assemblies 18 inflate below the circular form provided by airbags 17A of airbag assemblies 17 as shown in FIG. 7.

Figure 8:
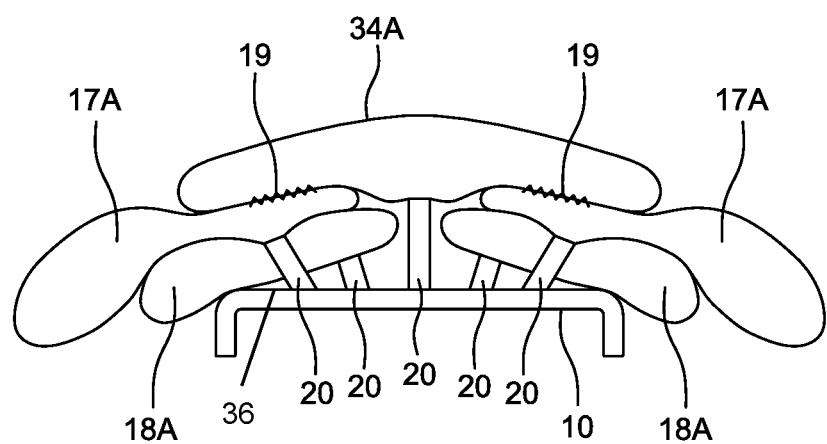
FIG. 8 is a side view of the deployed airbags from the airbag system shown in FIG. 5.

FIG. 8 shows the heights of the airbags 17A, 18A, 34A when deployed, i.e., the different levels of deployment relative to the uniformly planar (flat) upper surface 36 of the holder 10. The airbag 34A from airbag assembly 34 is at the top, immediately overlying the airbags 17A from airbag assemblies 17 which in turn immediately overlie the airbags 18A of airbag assemblies 18.

With this inflation pattern of airbags from airbag assemblies 17, 18, 34, an improved cushioning effect may be provided to the occupant to be protected by the inflating airbags 17A, 18A, 34A. The occupant may be the driver, if the holder 10 is arranged in the core 13 of the steering wheel assembly, or may be a passenger if the holder is arranged on a dashboard or other structure in front of a passenger in a vehicle. The occupant would be protected by the outermost airbag which is supported by other airbags. By using multiple airbags in the inflation direction and also multiple airbags in different radial locations, an impacting occupant is better cushion since the flow of inflation medium is restricted. That is, when the occupant impacts the outermost airbag, the outermost airbag is restricted from being pushed inward by the presence of the intermediate and innermost airbags.

FIG. 8 also shows that it is possible to configure the airbags 17A, 18A of airbag assemblies 17, 18 to inflate toward one side, in this case, radially outward. Airbags 17A from airbag assemblies 17 are configured to inflate to extend primarily outward from the support bracket 20 on which they are mounted. Similarly, airbags 18A from airbag assemblies 18 are configured to inflate to extend primarily outward from the support bracket 20 on which they are mounted.

Although the embodiment of FIGS. 5-8 is described with respect to a driver's airbag inflating from the steering wheel assembly, the same use of different height support brackets and different sizes of airbag in airbag assembles mounted on the support brackets may be applied to different vehicular airbag arrangements that do not necessarily deploy from a steering wheel assembly. Also, it is possible to use the multiple inflators shown in FIG. 2 in or for any of the airbag assemblies 17, 18, 34 shown in FIGS. 5-8, e.g., provide two or more inflator systems mounted on the support bracket 20 for the central airbag assembly 34 and thus provide the central airbag assembly 34 with two or more airbags. Also, it is possible to use belts 21 as shown in FIGS. 3 and 4 over and around any or all of the airbags deploying from the airbag assemblies 17, 18 and 34 shown in FIGS. 5-8. More generally, the features of any of the embodiments herein may be used with any of the other embodiments herein.

The use of multiple inflator systems and airbags as exemplified by the system shown in FIG. 2, the use of belts 21 to limit airbag expansion as exemplified by the system shown in FIGS. 3 and 4 and the multi-level airbag arrangement as exemplified by the system shown in FIGS. 5-8 are also very useful for the passenger and rear seat airbag systems. It is often the case that children are placed in a child seat in either the front passenger seat or in a rear seat. Even if the child seat is properly installed, a deploying airbag has an overwhelming force that can injure and potentially kill a child in such a child seat. The invention can effectively address this potential for harm by limiting the expansion/inflation of the airbag to thereby reduce the deployment force against the child seat yet be able to provide a sufficient cushioning effect for other types of seat occupancy than would result in movement of the occupant forward into contact with the airbag.

Thus, embodiments wherein the airbag systems of FIGS. 2-8 are installed in a headrest of a first seat of a vehicle for use by an occupant of a second seat behind the first set are considered part of the invention. Similar installation in the door or trim panels or dashboard of a vehicle is also encompassed within the scope and spirit of the invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A vehicular airbag system, comprising:
    a holder;
    a plurality of airbag assemblies, each of said airbag assemblies having an airbag that inflates outward, said airbags of a first set of said airbag assemblies each having a generally triangular airbag;
    a plurality of airbag support brackets arranged on said holder, each of said support brackets retaining one of said airbag assemblies, said support brackets having different heights relative to a plane defined by or through said holder such that said airbags inflate at different levels relative to said plane; and
    connectors that connect sides of said airbags of said first set of said airbag assemblies together.

2. The system of claim 1, wherein said holder includes a uniformly planar surface defining said plane, said support brackets having said different heights relative to said planar surface of said holder such that said airbags inflate at said different levels relative to said planar surface.

3. The system of claim 1, wherein said first set of said airbag assemblies includes a large airbag and a second set of said airbag assemblies includes a small airbag.

4. The system of claim 1, wherein said support brackets for said first set of airbag assemblies are arranged in a circle such that said generally triangular airbags of said first set of said airbag assemblies deploy to form a circular airbag structure.

5. The system of claim 1, wherein said first set of said airbag assemblies includes six airbag assemblies distributed equiangularly around said holder.

6. The system of claim 1, wherein each of said airbag assemblies further includes an inflator system for inflating said airbag of said airbag assembly.

7. The system of claim 1, wherein said support brackets provide the different heights relative to said plane and are arranged on said holder to cause said airbags to inflate over one another.

8. The system of claim 1, wherein the system is for a driver and further comprises a steering wheel assembly including a core, said holder being arranged in said core and said airbags inflating outward from said core.

9. The system of claim 8, further comprising a steering column, said steering wheel assembly being rotatably mounted to said steering column.

10. The system of claim 1, wherein a second set of said airbag assemblies includes a plurality of airbags each of which is a generally triangular airbag and inflate at a level closer to said plane than said airbags of said first set of said airbag assemblies, whereby said support brackets for said second set of said airbag assemblies are shorter in height relative to said plane than said support brackets for said first set of said airbag assemblies.

11. The system of claim 10, wherein said second set of said airbag assemblies includes six airbag assemblies distributed equiangularly around said plane and said first set of said airbag assemblies includes six airbag assemblies distributed equiangularly around said plane and outward of said six airbag assemblies of said second set.

12. The system of claim 10, wherein one of said support brackets is arranged in a center of an upper surface of said holder and has a height taller relative to said plane than said support brackets for said first and second sets of said airbag assemblies such that said airbag of said airbag assembly retained on said one of said support brackets inflates above all other airbags of said airbag assemblies.

13. The system of claim 1, wherein a first set of said support brackets is arranged at a first height from said plane and a second set of said support brackets is arranged at a second height from said plane different than the height at which said first set of said support brackets is arranged, each of said first and second sets of said support brackets including a plurality of support brackets.

14. The system of claim 13, wherein the first height is larger than the second height, and said first set of said airbag assemblies is arranged on said first set of said support brackets.

15. The system of claim 14, wherein said airbags of said airbag assemblies retained on said first set of said support brackets are larger than said airbags of said airbag assemblies retained on said second set of said support brackets.

16. The system of claim 15, wherein an additional one of said support brackets is arranged in a central location on said holder inward of said first and second sets of said support brackets and that supports a central airbag assembly including an airbag that inflates into a circular shape.

17. The system of claim 16, wherein said airbag of said central airbag assembly inflates above said airbags of said airbag assemblies retained on said first and second sets of said support brackets.

18. A vehicular airbag system, comprising:
    a steering wheel assembly including a core;
    a holder arranged in said core;
    a plurality of airbag assemblies, each of said airbag assemblies including an airbag that inflates outward from said core; and
    a plurality of airbag support brackets arranged on said holder, each of said airbag support brackets retaining at least one of said airbag assemblies, said support brackets having different heights relative to a plane defined by or through said holder such that said airbags inflate at different levels relative to said plane.

19. The system of claim 18, further comprising a steering column, said steering wheel assembly being rotatably mounted to said steering column.

20. A vehicular airbag system, comprising:
    a holder;
    a plurality of airbag assemblies, each of said airbag assemblies including an airbag that inflates outward; and
    a plurality of airbag support brackets arranged on said holder, each of said airbag support brackets retaining at least one of said airbag assemblies, said support brackets having different heights relative to a plane defined by or through said holder such that said airbags inflate at different levels relative to said plane, said holder includes a uniformly planar surface defining said plane,
    wherein a first set of said support brackets is arranged at a first height from said plane and a second set of said support brackets is arranged at a second height from said plane different than the height at which said first set of said support brackets is arranged, each of said first and second sets of support brackets including a plurality of support brackets.

21. The system of claim 20, wherein the first height is larger than the second height, and said first set of said airbag assemblies is arranged on said first set of said support brackets.

22. The system of claim 21, wherein said airbags of said airbag assemblies retained on said first set of said support brackets are larger than said airbags of said airbag assemblies retained on said second set of said support brackets.

23. The system of claim 22, wherein an additional one of said support brackets is arranged in a central location on said holder inward of said first and second sets of said support brackets and that supports a central airbag assembly including an airbag that inflates into a circular shape.

24. The system of claim 23, wherein said airbag of said central airbag assembly inflates above said airbags of said airbag assemblies retained on said first and second sets of said support brackets.

* * * * *